United States Patent [19]

Katz

[11] Patent Number: 5,377,619
[45] Date of Patent: Jan. 3, 1995

[54] PET CAGE BARRIER

[76] Inventor: George Katz, P.O. Box 3106, Herzliya, Israel

[21] Appl. No.: 165,458

[22] Filed: Dec. 13, 1993

[51] Int. Cl.⁶ .............................................. A01K 31/00
[52] U.S. Cl. ...................................................... 119/17
[58] Field of Search ..................... 119/223, 17, 15, 18, 119/23

[56] References Cited

U.S. PATENT DOCUMENTS

| | | | |
|---|---|---|---|
| 1,212,771 | 1/1917 | Holland | 119/17 |
| 2,538,853 | 1/1951 | Worl | 119/17 X |
| 2,799,244 | 7/1957 | Dorsey | 119/17 |
| 2,845,895 | 8/1958 | Balkauskas | 119/17 |
| 3,272,376 | 9/1966 | Tierney et al. | 119/17 |
| 3,683,857 | 8/1972 | Yellin | 119/17 |
| 3,702,109 | 11/1972 | Van Huis | 119/17 |
| 4,097,097 | 6/1978 | Hosko | 119/17 X |

FOREIGN PATENT DOCUMENTS 2532342 2/1977 Germany ............................... 119/17

Primary Examiner—Gene Mancene
Assistant Examiner—Thomas Price
Attorney, Agent, or Firm—Edward Langer

[57] ABSTRACT

A pet cage provided with a barrier made of a plurality of thin, flexible plastic or metal wires stretched between a cage top and base which are spaced apart by a support post. The thin wires are effective as a physical barrier and practically do not block the passage of light or airflow to and from the cage interior. Thus, the inventive pet cage barrier enhances the pet owner's enjoyment by Improving the balance between the confining and visibility functions of the cage. The flexible nature of the pet cage barrier allows the cage to be packaged in a folded, compact fashion which is easily transported, and the simple design enables quick assembly, both desirable features unavailable in existing cage designs.

10 Claims, 9 Drawing Sheets

PET CAGE BARRIER

FIELD OF THE INVENTION

The present invention relates to bird and pet equipment and the like, and more particularly, to a pet cage barrier constructed to enable increased visibility of caged birds and pets.

BACKGROUND OF THE INVENTION

The design of pet and bird cages is generally directed to achieving the combined functions of confining the pet to a defined space, while allowing the pet owner maximum visibility.

There are many known varieties of pet and bird cages which incorporate different designs and which convey an aesthetic impression, and these generally rely on a combination of materials including metal frames, and a barrier formed by metal posts spaced to allow for visibility of the caged pet while blocking exit from the cage. Glass is also used for this purpose, but this restricts airflow and increases the isolation of the pet from its surroundings, which may be undesirable.

Dependent on the materials used, the combined functions mentioned above may present conflicting constraints. Clearly, the confining function of the cage must be considered paramount, and yet in order for the pet owner to obtain maximum enjoyment, the cage design must not severely impinge on the visibility function.

Therefore, It would be desirable to provide a pet cage which correctly balances the confinement and visibility functions.

SUMMARY OF THE INVENTION

Accordingly, it is a principal object of the present invention to overcome the above-mentioned disadvantages of prior art pet cage designs and provide a pet cage barrier which securely encloses the pet within the cage while enhancing visibility of the pet and increasing overall viewing enjoyment.

In accordance with a preferred embodiment of the present invention, there is provided a pet cage barrier comprising:

- a plurality of cage sections being spaced apart and defining a volume therebetween;
- a plurality of thin, flexible wires tensioned between said cage sections, said wires blocking exit of a pet from said volume while allowing maximum visibility therewithin.

In the preferred embodiment, the pet cage barrier is a plurality of thin, flexible plastic or metal wires provided as a plurality of thin, flexible plastic or metal wires stretched between a cage top and base which are spaced apart by a support post. The thin wires are effective as a physical barrier and practically do not block the passage of light or airflow to and from the cage interior. Thus, the inventive pet cage barrier enhances the pet owner's enjoyment by improving the balance between the confining and visibility functions of the cage.

The flexible nature of the pet cage barrier allows the cage to be packaged in a folded, compact fashion which is easily transported, and the simple design enables quick assembly, both desirable features unavailable in existing cage designs.

Other features and advantage of the inventive pet cage barrier will become apparent from the following description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENTS

Figure 1A:
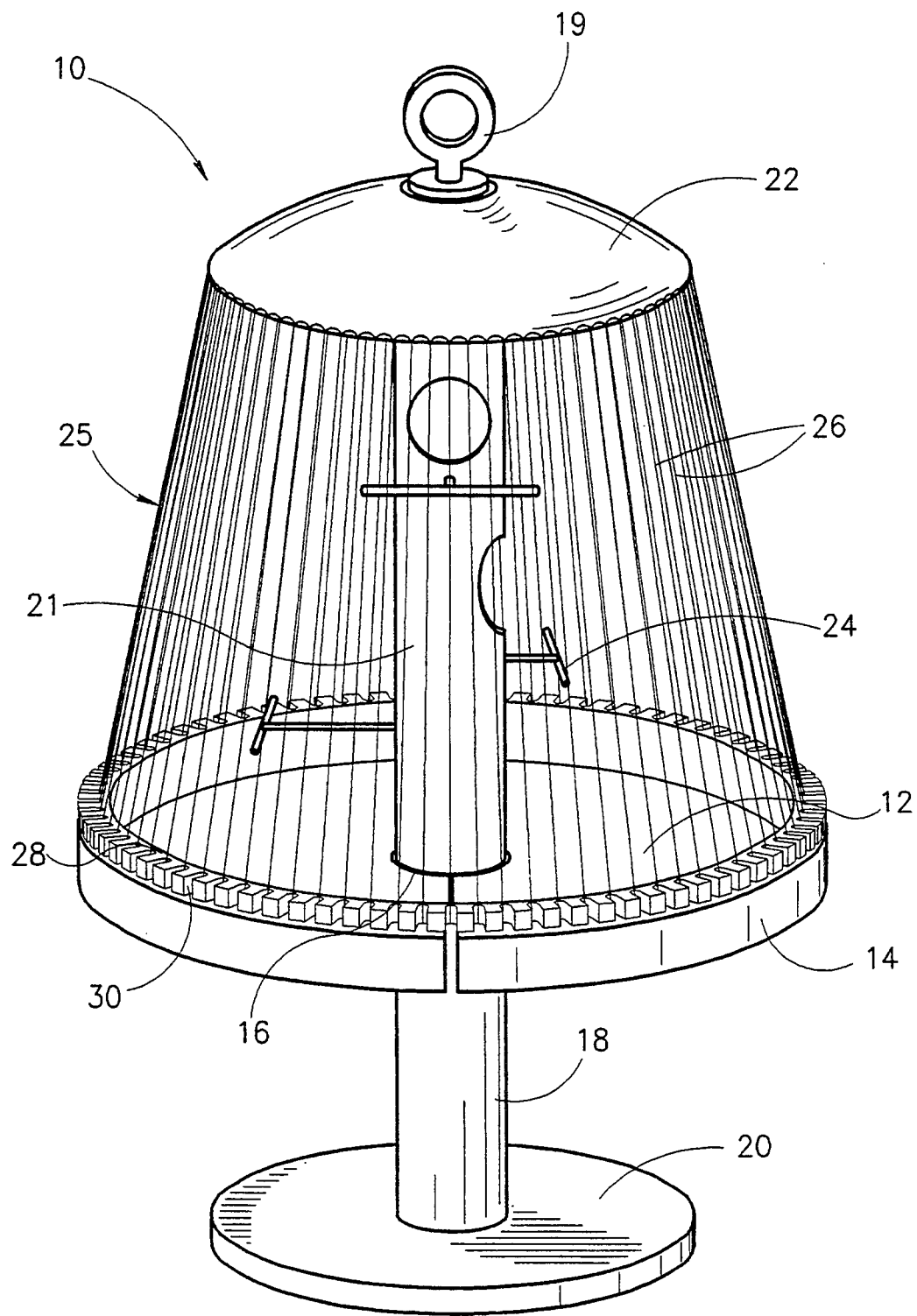
FIGS. 1a–b are, respectively, perspective and cross-sectional side views of a pet cage constructed in accordance with a preferred embodiment of the invention.
Figure 1B:
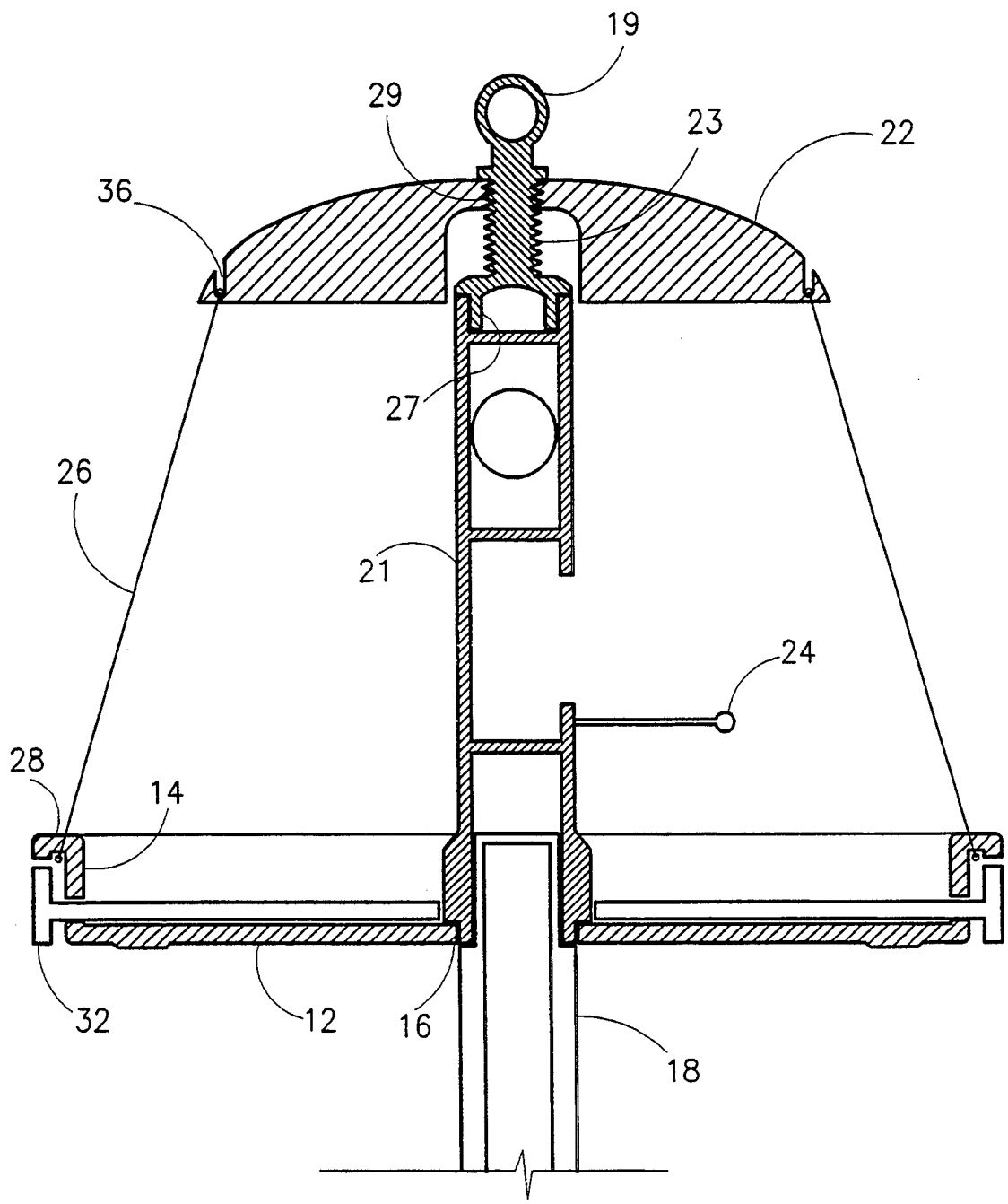

Referring now to FIGS. 1a–b, there are shown perspective and cross-sectional side views of a pet cage 10 constructed in accordance with a preferred embodiment of the invention. Cage 10 comprises a circular base 12 having a rim 14 extending vertically therefrom, and a hole 16 formed centrally therein. A support post 18 extends vertically from a pedestal 20 and through central hole 16 of base 12, to support a top section 22 of cage 10 on a column 21. A plurality of bars 24 extending horizontally from support post 18 provide a bird perch.

In accordance with the principles of the present invention, there is provided a pet cage barrier 25 which securely encloses the pet within cage 10 while enhancing visibility of the pet and increasing overall viewing enjoyment. For this purpose, pet cage barrier 25 is provided as a plurality of thin, flexible plastic or metal wires 26 tensioned between cage top section 22 and base 12. The wires are essentially colorless, and therefore they tend to blend in with the background and do not distract the viewer's eye. Where cage 10 is used to house parakeets and other pet birds, an "open" overall appearance is conveyed to the viewer. For example, metal wires 26 having a 0.1–0.4 mm diameter may be used, or if plastic wires are used, a 0.2–1 mm diameter.

As shown in the cross-sectional view of FIG. 1b, the height of top section 22 above base 12 can be determined by adjusting a screw 23 formed with a thumb grip 19 and formed with a lower portion 27 seated for tightening against column 21. The tension in wires 26 may then be fixed by turning screw 23 in a central threaded hole 29 of cage top section 22.

Figure 2:
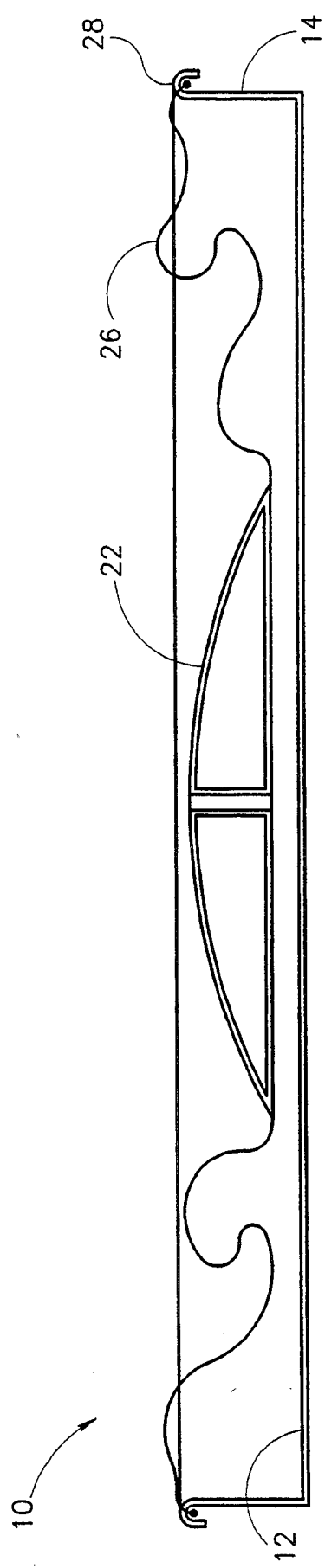
FIG. 2 is a side view of the cage of FIG. 1 prior to assembly.

In FIG. 2, there is shown a side view of the cage of FIG. 1, illustrating the cage 10 sections prior to assembly. Top section 22 of cage 10 is shown resting on base 12, and the flexible wires 26 are not tensioned, since support post 18 and column 21 are removed. In this condition, cage 10 can easily be packed and shipped, and can also be quickly re-assembled.

Figure 3:
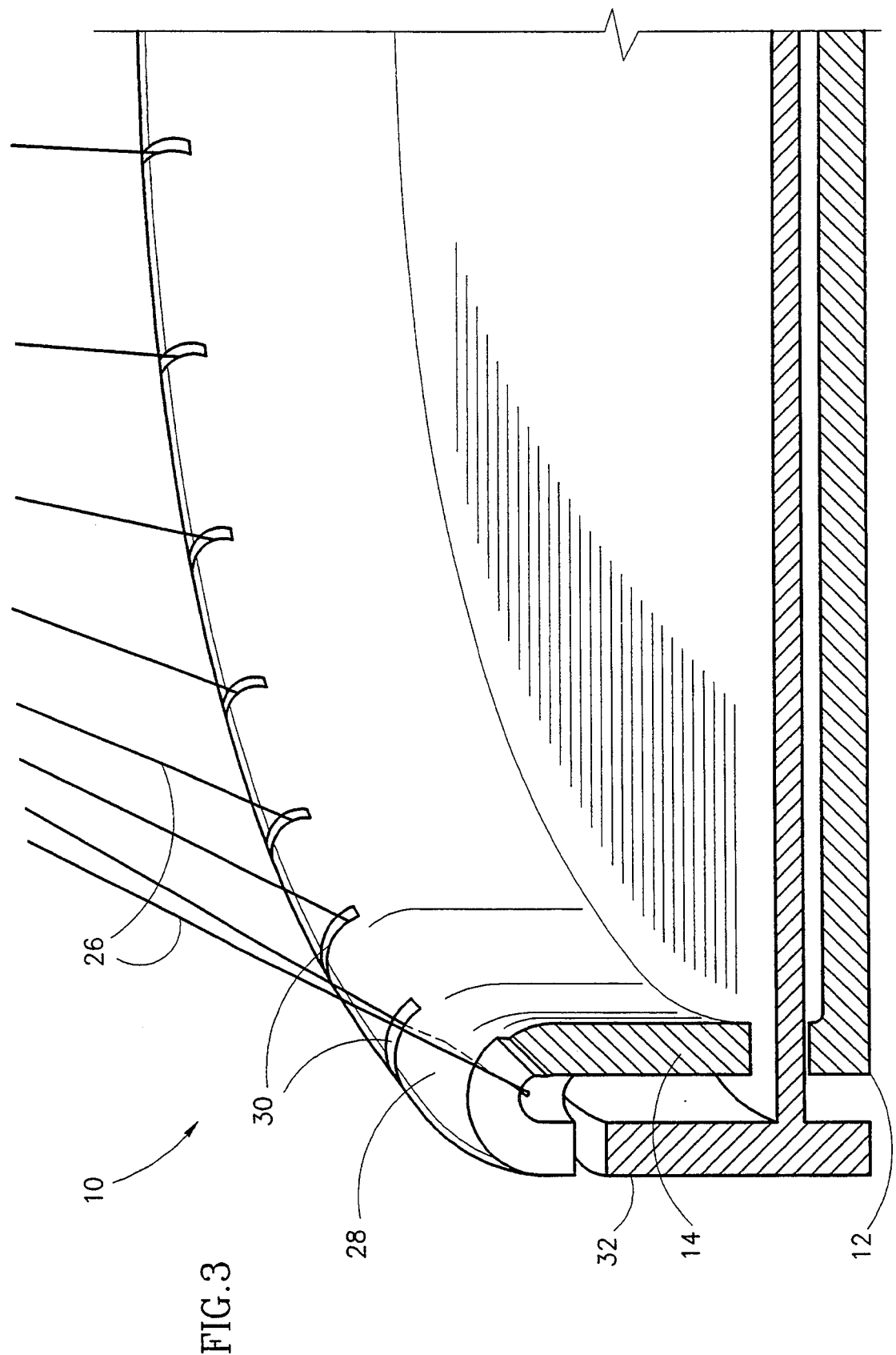
FIG. 3 is a partial cross-sectional view of the cage.

In FIG. 3, there is shown a partial cross-sectional view of cage 10, providing further construction details. Rim 14 is shown having a top edge 28 folded over and formed with slots 30. During assembly, wires 26 are looped between a pair of slots 30 so as to be anchored thereby, and are then connected to top section 22. By placement of top section 22 on column 21 and adjustment of screw 23, tension is developed in wires 26, providing pet cage barrier 25.

The outer edge of top section 22 is formed with a plurality of notches 36 (FIG. 1b) located about its circumference, each of which provides an anchor for a loop of wires 26 extending from rim 14. The circumferentially-located notches 36 correspond to slots 30 in rim 14, to balance the tension in wires 26 extending between top section 22 and rim 14.

As seen in FIG. 3, a slidably removable tray 32 may be seated in a portion of rim 14 of base 12, for collecting pet waste or leftover food.

Figure 4:
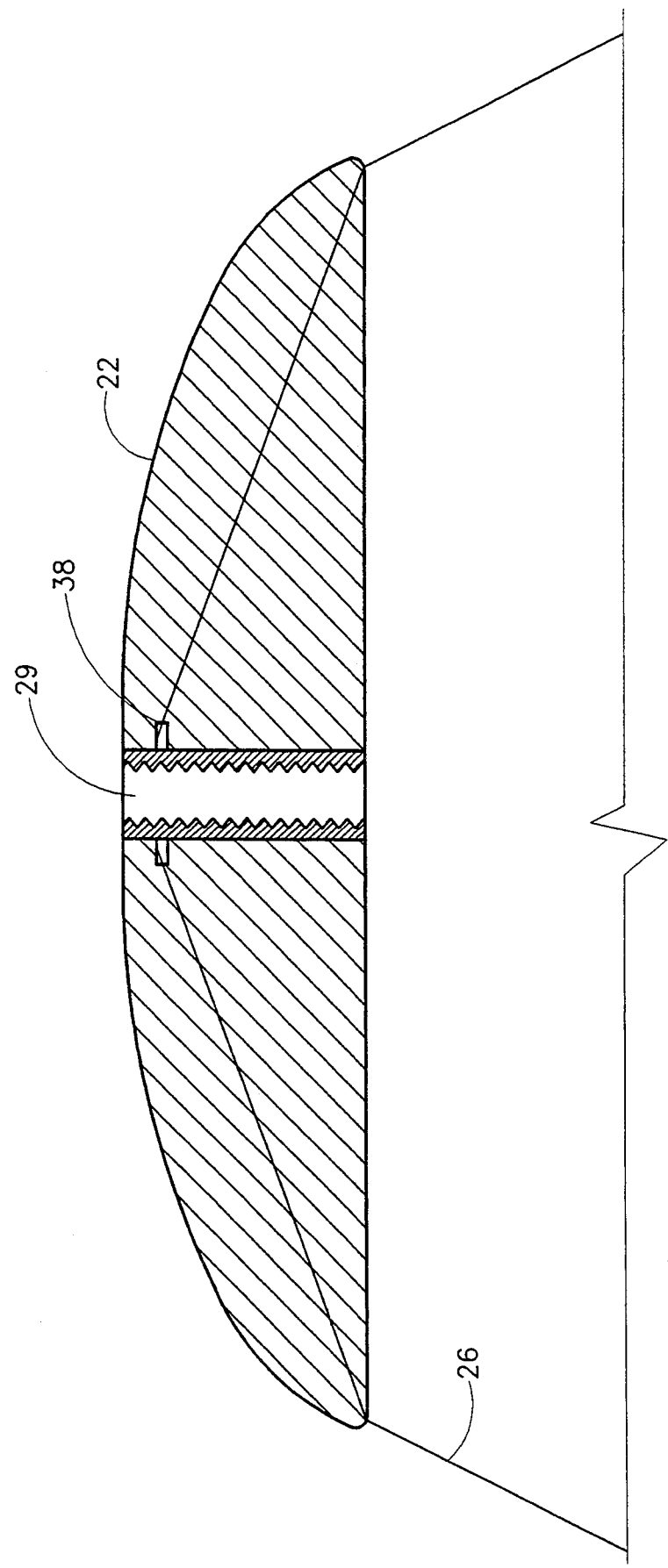
FIG. 4 is a cross-sectional view of a top cage portion.

In FIG. 4, there is shown a cross-sectional view of cage 10 top section 22, which is constructed as a truncated spherical shape formed with centrally located hole 29. In this construction, pet cage barrier 25 is provided as a single continuous wire 26 looped around a ring 38 mounted over the circumference of threaded hole 29. Material may be used to fill the interior of top section 22, to secure the placement of wire 26 on ring 38. The individual loops of wire 26 can then be inserted in slots 30 in rim 14 and tension provided in wires 26 by tightening screw 23 in threaded hole 29 against column 21.

Figure 5A:
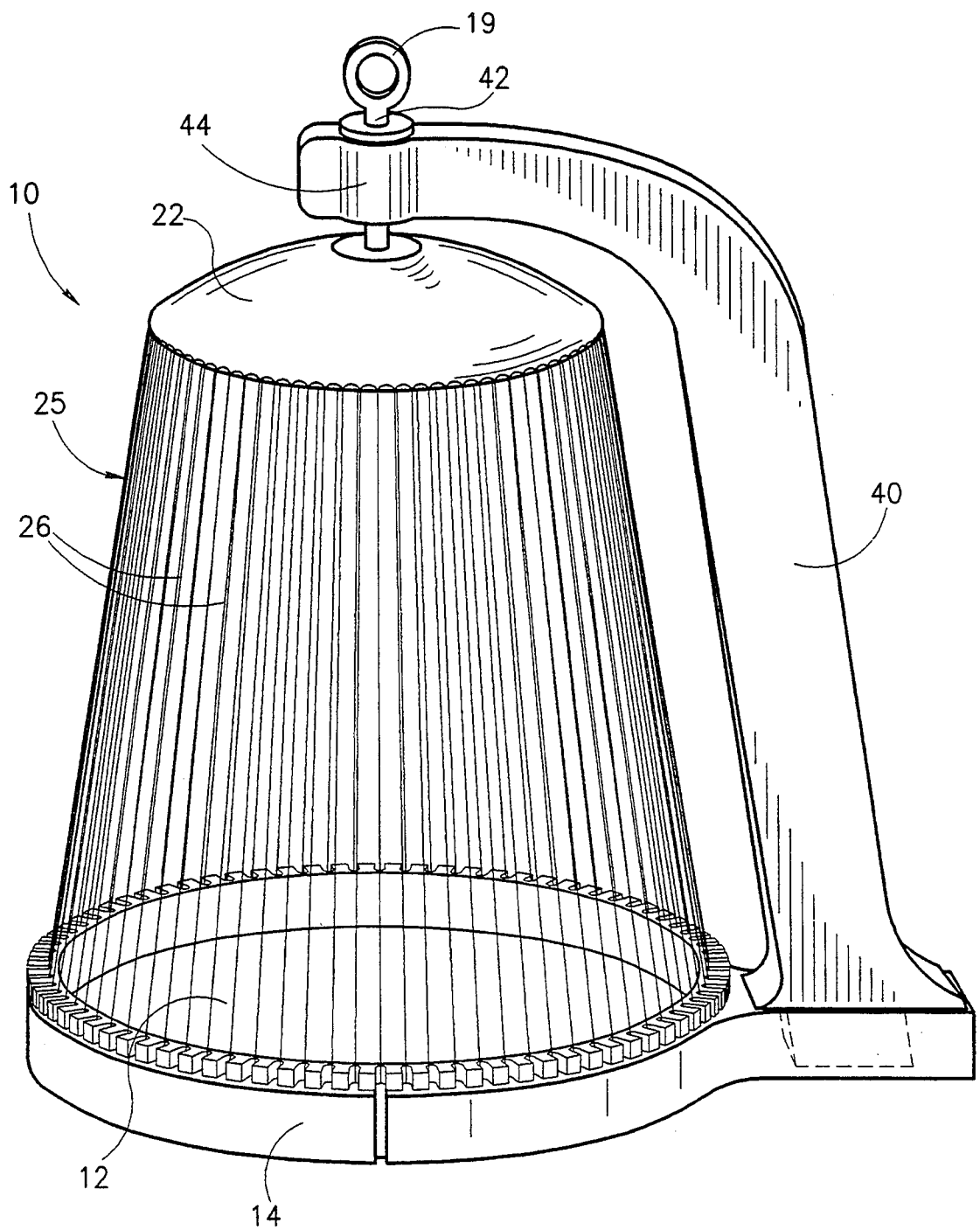
FIGS. 5a–b are respectively, perspective and cross-sectional side views of an alternative embodiment of the pet cage.
Figure 5B:
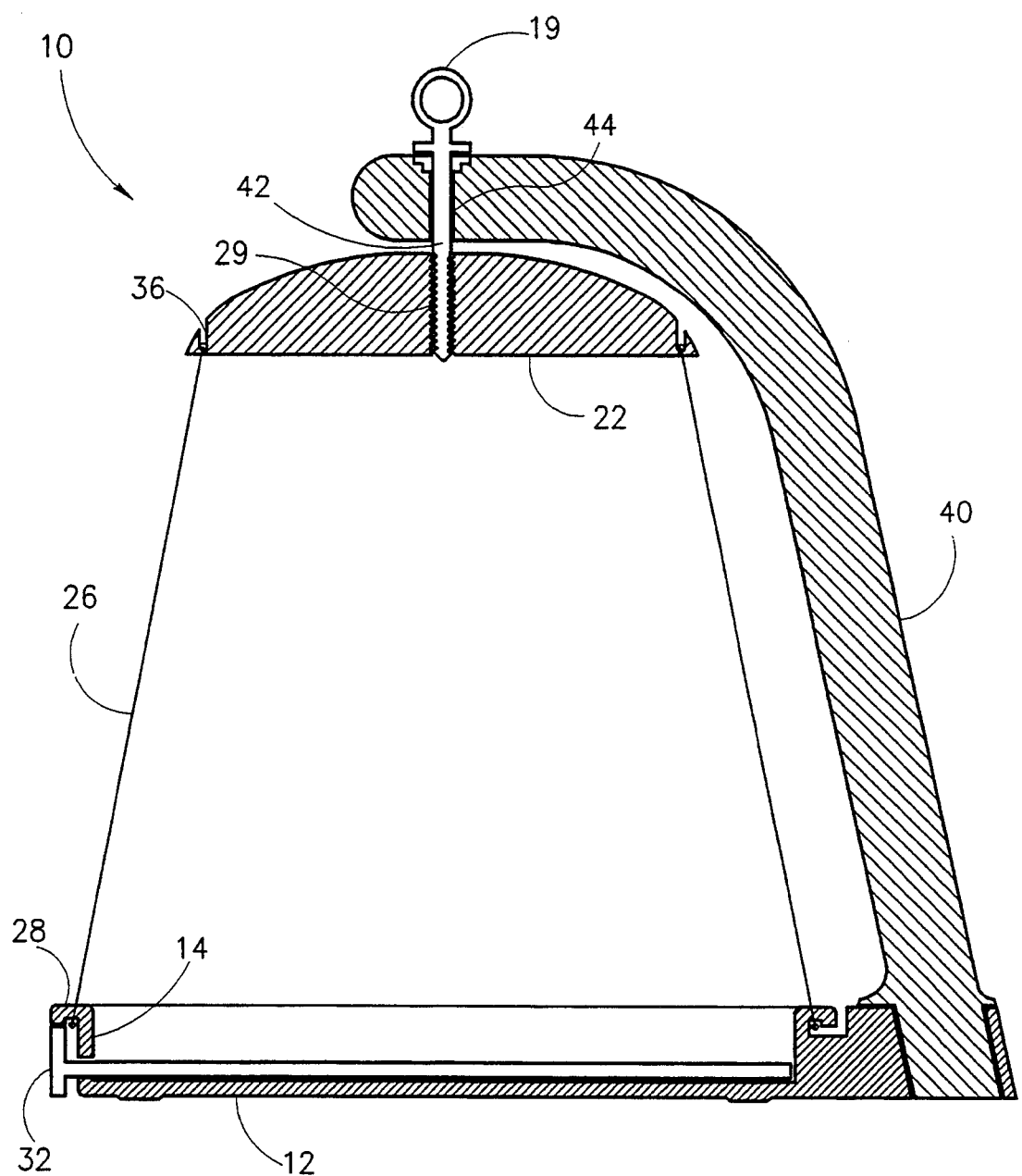
Figure 6:
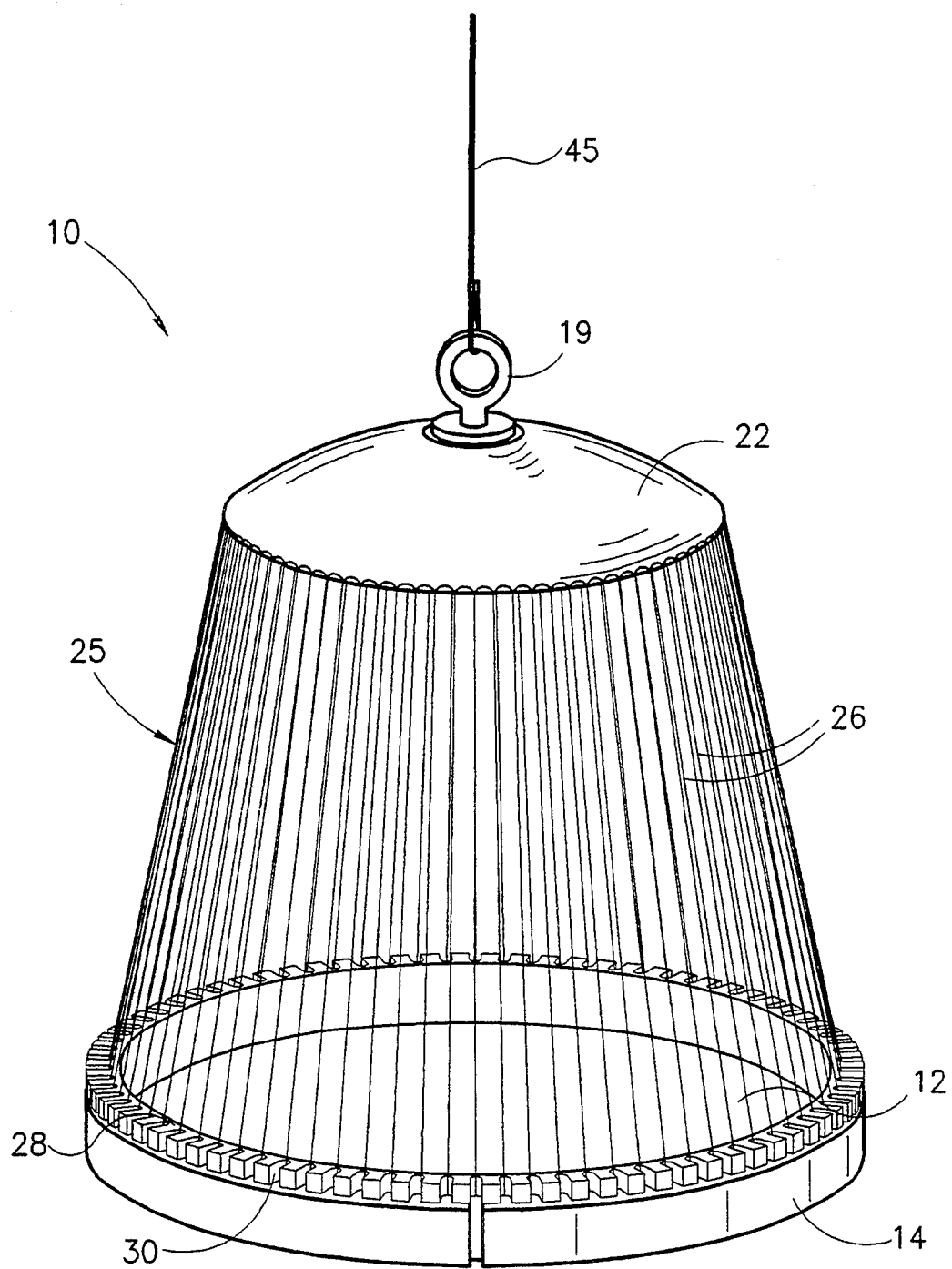
FIG. 6 is another alternative embodiment of the pet cage featuring a suspended construction.
Figure 7:
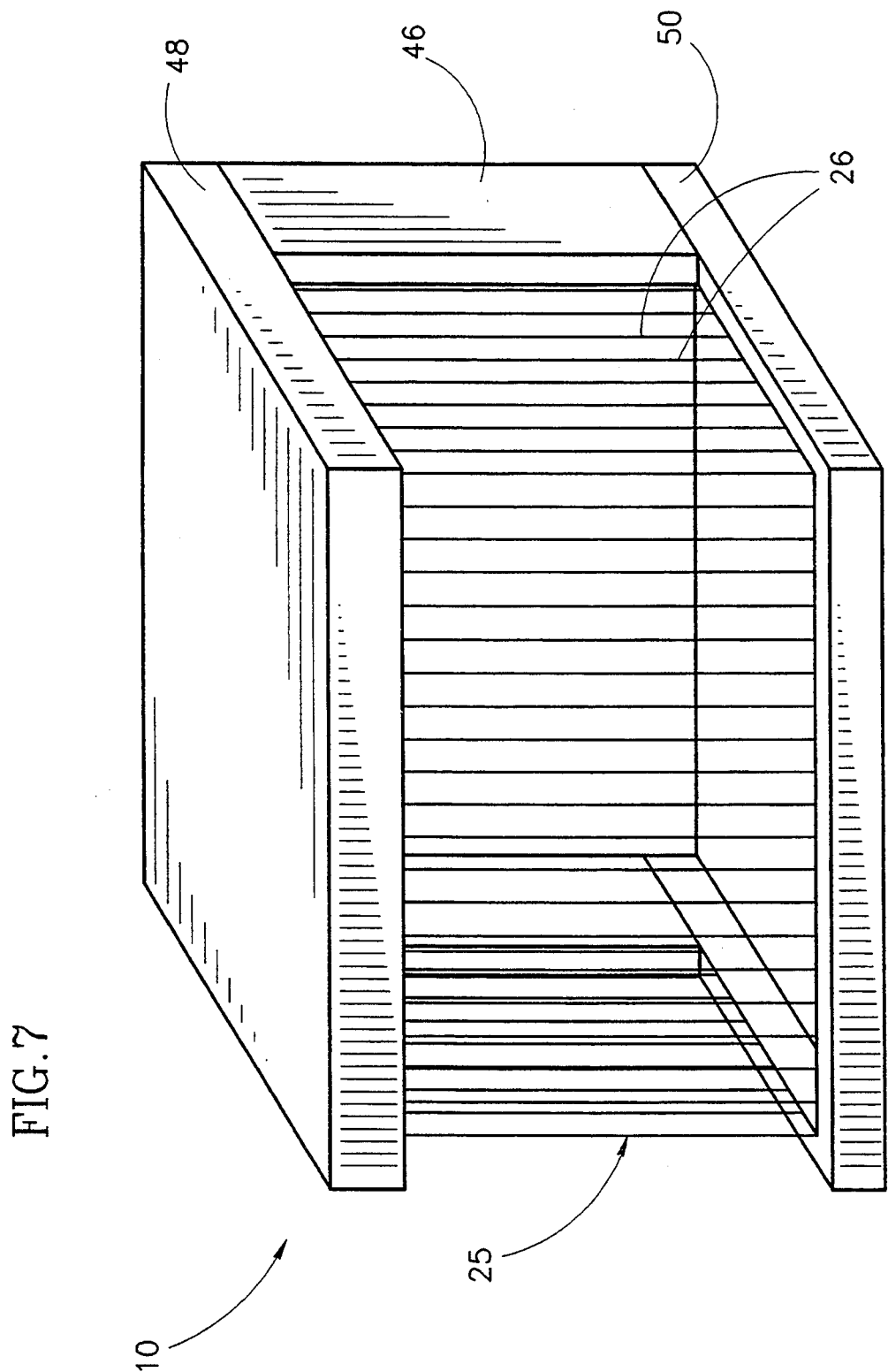
FIG. 7 is still another alternative embodiment of the pet cage featuring a rectangular construction with a rigid wall.

Referring now to FIGS. 5-7, there are shown alternative embodiments of the inventive pet cage 10. In FIGS. 5a–b, pet cage 10 is constructed using an external support arm 40 which replaces the function of support column 21 of FIG. 1. External support arm 40 is curved with its lower end anchored to rim 14 so that it extends vertically over the top section 22 of cage 10. An adjustment screw 42 is seated in a socket 44 formed at the end of arm 40, and screw 42 engages threaded hole 29 to enable adjustment of the height of top section 22 above base 12, thereby adjusting the tension in wires 26 providing pet cage barrier 25.

In FIG. 6, there is shown an alternative embodiment of the inventive pet cage 10 featuring a suspended construction. In this arrangement, a cord 45 is attached to top section 22 of cage 10 so that it is suspended vertically, and the weight of base 12 serves to develop tension in wires 26 of pet cage barrier 25.

FIG. 7 shows still another alternative embodiment of the inventive pet cage 10, featuring a rectangular construction with a rigid wall 46 supporting an upper cage section 48 and over a base 50. In this construction, the height of upper cage section 48 over base 50 is determined by rigid wall 46, which establishes the tension in wires 26 extending between base 50 and upper section 48.

Having described the invention with regard to certain specific embodiments thereof, it is to be understood that the description is not meant as a limitation, since further modifications may now suggest themselves and it is intended to cover such modification as fall within the scope of the appended claims.

I claim:

1. A pet cage barrier comprising:
   a plurality of cage sections comprising a top and a base section maintained spaced apart from one another by a rigid frame portion so as to define a volume therebetween; and
   a plurality of thin, flexible wires tensioned between said cage sections, said wires blocking exit of a pet from said volume while allowing maximum visibility therewithin;
   wherein said rigid frame portion comprises a support arm extending external to said volume between said cage sections.

2. The pet cage barrier of claim 1 further comprising a screw arranged to engage said rigid frame portion and provide adjustment of the spacing between said cage sections.

3. The pet cage barrier of claim 1 wherein said flexible wires are stretched with a tension adjustable in relation to a distance by which said cage sections are spaced apart.

4. The pet cage barrier of claim 1 wherein said cage sections are formed with notches which retain said flexible wires.

5. The pet cage barrier of claim 1 wherein said cage sections are collapsible for packing when said wires are released.

6. The pet cage barrier of claim 1 wherein said flexible wires comprise a continuous strand of wire looped between said cage sections.

7. A pet cage barrier comprising:
   a plurality of cage sections comprising a top and a base section maintained spaced apart from one another by a rigid frame portion so as to define a volume therebetween; and
   a plurality of thin, flexible wires tensioned between said cage sections, said wires blocking exit of a pet from said volume while allowing maximum visibility therewithin;
   wherein said rigid frame portion comprises a rigid wall extending adjacent said volume between said cage sections.

8. The pet cage barrier of claim 7 further comprising a screw arranged to engage said rigid frame portion and provide adjustment of the spacing between said cage sections.

9. A pet cage barrier comprising:
   a plurality of cage sections comprising a top and a base section maintained spaced apart from one another by a rigid frame portion so as to define a volume therebetween: and
   a plurality of thin, flexible wires tensioned between said cage sections, said wires blocking exit of a pet from said volume while allowing maximum visibility therewithin;
   wherein said rigid frame portion comprises a support post extending within said volume between said cage sections.

10. The pet cage barrier of claim 9 further comprising a screw arranged to engage said rigid frame portion and provide adjustment of the spacing between said cage sections.

* * * * *